US008069746B2

United States Patent
Bao et al.

(10) Patent No.: US 8,069,746 B2
(45) Date of Patent: Dec. 6, 2011

(54) AUXILIARY DEVICE FOR MECHANICAL ARM

(75) Inventors: Rong-Mou Bao, Shenzhen (CN); Ga-Lei Hu, Shenzhen (CN); Tao-Jun Huang, Shenzhen (CN); Jian-Long Xing, Shenzhen (CN); Chun-Nan Ou, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 748 days.

(21) Appl. No.: 12/189,125

(22) Filed: Aug. 8, 2008

(65) Prior Publication Data

US 2009/0277297 A1    Nov. 12, 2009

(30) Foreign Application Priority Data

May 8, 2008 (CN) .......................... 2008 1 0301472

(51) Int. Cl.
*B25J 17/02* (2006.01)
(52) U.S. Cl. ............... 74/490.01; 74/490.05; 74/490.06; 414/738
(58) Field of Classification Search .............. 74/490.01, 74/490.05, 490.06; 414/719, 738
See application file for complete search history.

(56) References Cited

U.S. PATENT DOCUMENTS

| 2,813,645 | A | * | 11/1957 | Pilch | 414/694 |
| 4,705,438 | A |   | 11/1987 | Zimmerman et al. | |
| 5,584,646 | A | * | 12/1996 | Lewis et al. | 414/738 |
| 5,738,481 | A | * | 4/1998 | Rogers | 414/744.6 |
| 6,010,294 | A | * | 1/2000 | Lyddon | 414/23 |
| 7,503,134 | B2 | * | 3/2009 | Buckner | 37/317 |
| 2006/0117895 | A1 | * | 6/2006 | Sevenster | 74/490.01 |

* cited by examiner

*Primary Examiner* — Alicia Torres
(74) *Attorney, Agent, or Firm* — Altis Law Group, Inc.

(57) ABSTRACT

An auxiliary device for a mechanical arm includes a supporting base, two reciprocating engines, a rotational plate, and four suction members. The reciprocating engine includes a cylinder and a driving rod. The cylinder is configured for driving the driving rod linearly and reciprocating along its longitudinal axis. The cylinder is rotatably fixed to the supporting base, thereby defining a first rotational axis therebetween. The driving rod is rotatably fixed to the rotational plate, thereby defining a second rotational axis therebetween. The rotational plate is also directly and rotatably fixed to the supporting base to be rotatable about a third rotational axis defined therebetween. The three rotational axes are parallel. The four suction members are fixed to the rotational plate.

11 Claims, 2 Drawing Sheets

AUXILIARY DEVICE FOR MECHANICAL ARM

BACKGROUND

1. Field of the Invention

The present invention relates to mechanical arms and, particularly, to an auxiliary device for a mechanical arm.

2. Description of Related Art

Mechanical arms, while widely used in manufacturing, may be limited in application by the inability to perform fine adjustment of position when locating a workpiece.

Therefore, it is desirable to provide an auxiliary device for a mechanical arm that can overcome the stated limitations.

SUMMARY

In an exemplary embodiment, an auxiliary device for a mechanical arm includes a supporting base, two reciprocating engines, a rotational plate, and four suction members. Each reciprocating engine includes a cylinder and a driving rod. The cylinder is configured for driving the driving rod linearly and reciprocating along its longitudinal axis. The cylinder is rotatably fixed to the supporting base, thereby defining a first rotational axis therebetween. The driving rod is rotatably fixed to the rotational plate, thereby defining a second rotational axis therebetween. The rotational plate is rotatably fixed to the supporting base so as to be rotatable about a third rotational axis defined therebetween. The three rotational axes are parallel to each other. The four suction members are fixed to the rotational plate.

DETAILED DESCRIPTION

Embodiments of the present auxiliary device will now be described in detail with references to the drawings.

Figure 1:
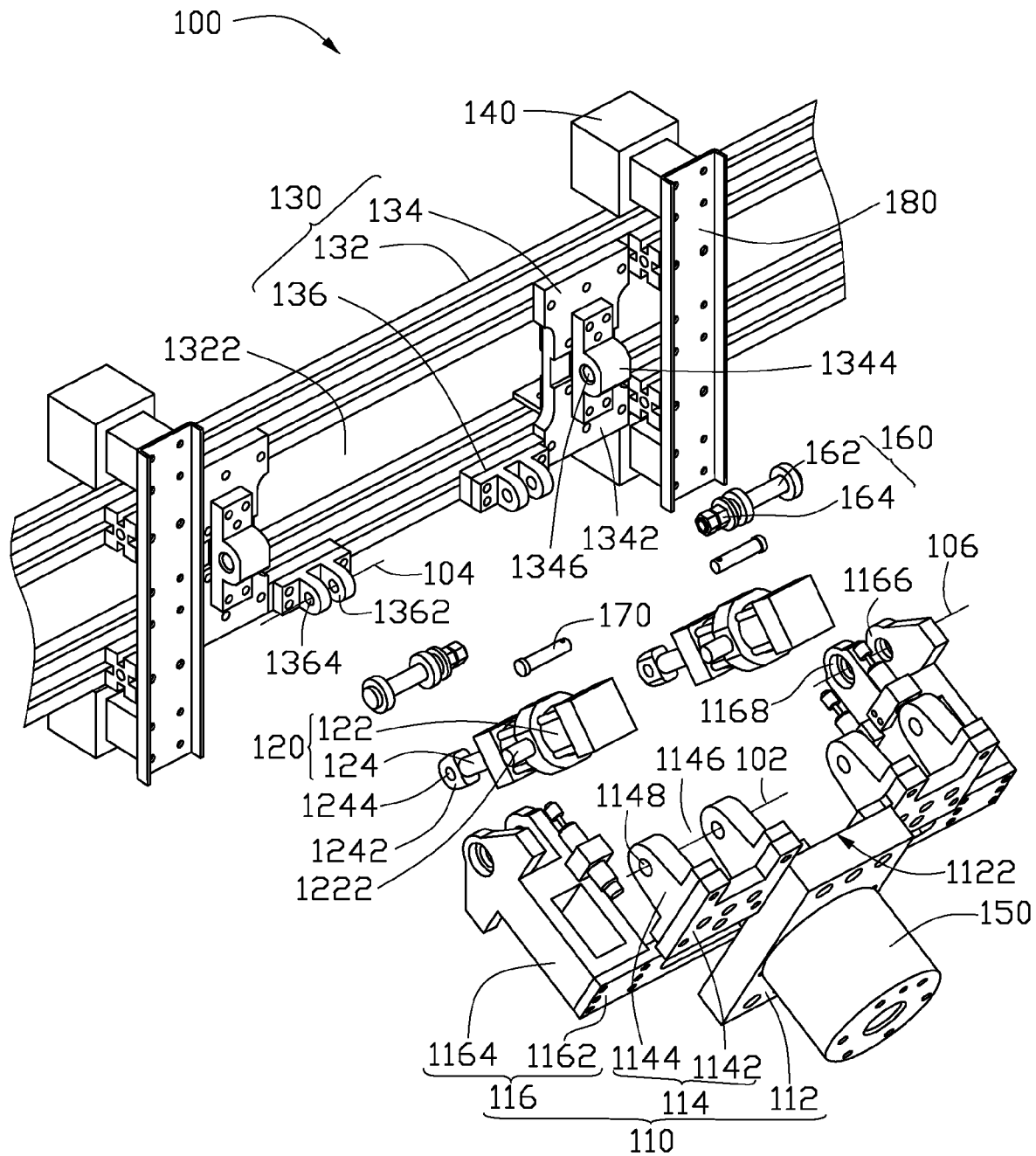
FIG. 1 is an exploded, isometric view of an auxiliary device, according to an exemplary embodiment.
Figure 2:
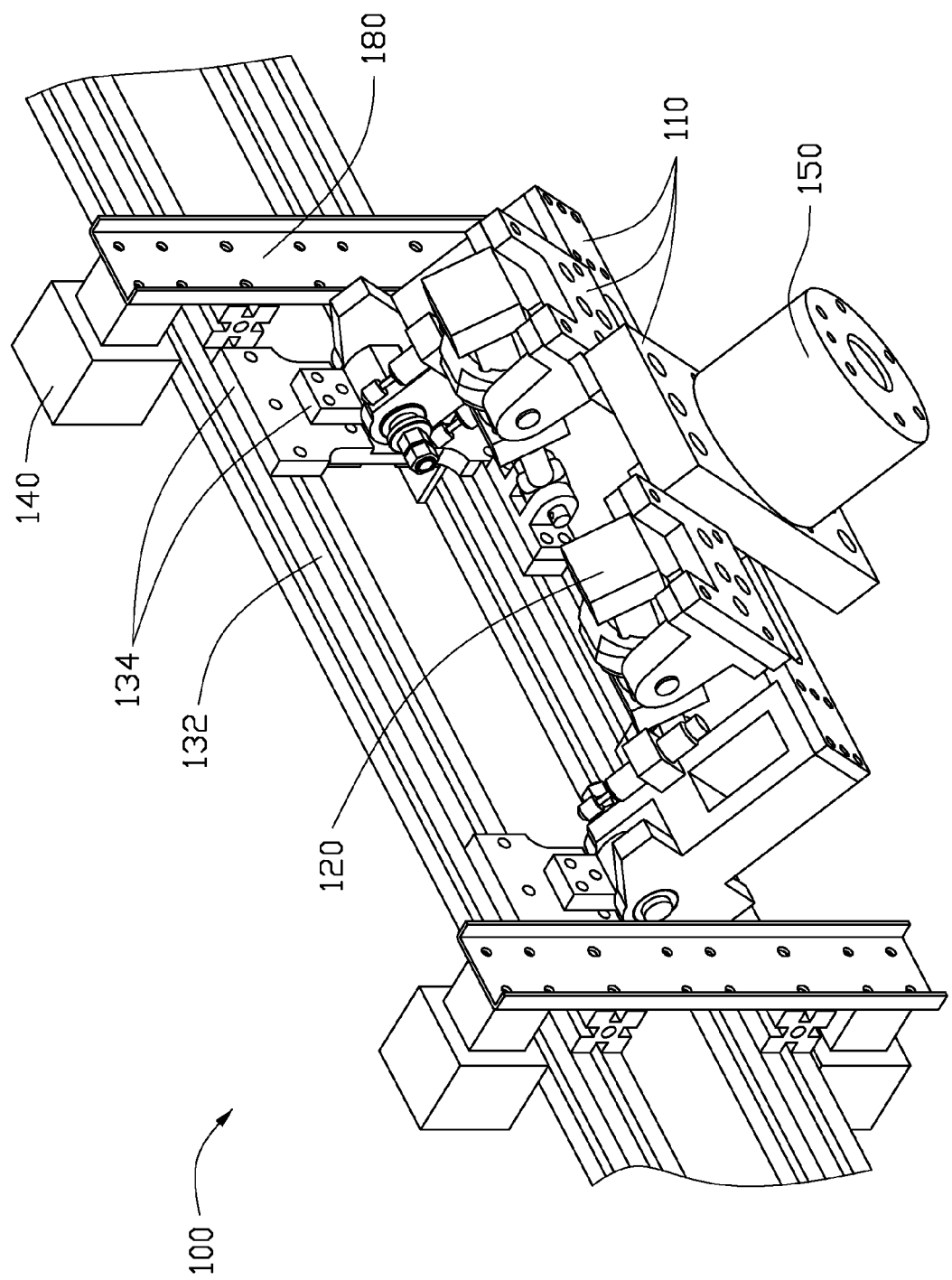
FIG. 2 is an assembled, isometric view of the auxiliary device of FIG. 1.

Referring to FIGS. 1-2, an auxiliary device 100, according to an exemplary embodiment, includes a supporting base 110, two reciprocating engines 120, a rotational plate 130, and four suction members 140. Each of the reciprocating engines 120 includes a cylinder 122 and a driving rod 124. The cylinder 122 is configured for driving the driving rod 124 linearly and reciprocating along its longitudinal axis. The cylinder 122 is rotatably fixed to the supporting base 110, thereby defining a first rotational axis 102 between the cylinder 122 and the supporting base 110. The driving rod 124 is rotatably fixed to the rotational plate 130, thereby defining a second rotational axis 104 between the driving rod 124 and the rotational plate 130. The rotational plate 130 is rotatably fixed to the supporting base 110 so as to be rotatable about a third rotational axis 106 defined between the rotational plate 130 and the supporting base 110. The three rotational axes 102, 104, 106 are parallel. The four suction members 140 are fixed to the rotational plate 130.

The auxiliary device 100 may further include a connection member 150 by means of which supporting base 110 is fixed to a mechanical arm (not shown), allowing incremental and precise positioning thereof. In this embodiment, the connection member 150 is a cylindrical block.

The supporting base 110 includes a supporting plate 112, two cylindrical seats 114, and two fulcrum arms 116. The supporting plate 112 is fixed to the connection member 150. The two cylindrical seats 114 and the two fulcrum arms 116 are fixed to a surface 1122 of the supporting plate 112 opposing the connection member 150. In this embodiment, the supporting plate 112 is a square plate. Each of two opposing edges of the surface 1122 of the supporting plate 112 supports one cylindrical seat 114 and one fulcrum arm 116.

The cylindrical seat 114 includes a first button plate 1142 and two parallel side plates 1144. The first button plate 1142 is fixed to the surface 1122 of the supporting plate 112. The two parallel side plates 1144 are vertically fixed to a surface of the first button plate 1142 opposing the supporting plate 112 and collaboratively defining a cylindrical cavity 1146 therebetween. The cylindrical cavity 1146 partially or wholly receives a rotating cylinder 122. The two parallel side plates 1144 also define two first fulcrum holes 1148 thereon, respectively, and are aligned with each other and thereby define the first rotational axis 102. Accordingly, the cylinder 122 forms two side shafts 1222 engaging the two first fulcrum holes 1148, respectively. As a result, the cylinder 122 is rotatable about the first rotational axis 102 in the cylindrical cavity 1146.

The fulcrum arm 116 includes a second button plate 1162 and a frame 1164. The second button plate 1162 is fixed to the surface 1122 of the supporting plate 112. The frame 1164 is vertically fixed to a surface of the second button plate 1162 opposing the supporting plate 112. The frame 1164 defines a block cavity 1166 and two second fulcrum holes 1168. The second fulcrum holes 1168 are aligned and thereby define the third rotational axis 106.

The cylinder 122 can be a hydraulic pressure cylinder or an air pressure cylinder. This cylinder 122 typically includes a piston (not shown) sealed therein that can, when driven by the hydraulic pressure or air pressure, linearly travel in the cylinder 122. The driving rod 124 has one end (not shown) fixed to the piston with the other driving end 1242 protruding from the cylinder 122. The driving end 1242 defines a rod hole 1244 therein.

The rotational plate 130 includes a main board 132, two shaft blocks 134, and two rod seats 136. The two shaft blocks 134 and the two rod seats 136 are fixed to a surface 1322 of the main board 132 facing the supporting base 110.

The two shaft blocks 134 are positioned corresponding to the two fulcrum arms 116, respectively. Each of the shaft blocks 134 includes a third button plate 1342 and a rotating block 1344. The third button plate 1342 is fixed to the surface 1322 of the main board 132. The rotating block 1344 is fixed to the third button plate 1342 and defines a shaft hole 1346 therein. Each of the rotating blocks 1344 is received in a corresponding block cavity 1166, with the shaft hole 1346 aligned with the two corresponding second fulcrum holes 1168. The auxiliary device 100 further includes two first fastening pins 160, each of which is configured for rotatably fastening a shaft block 134 to a corresponding fulcrum arm 116. For example, the first fastening pin 160 can include a screw 162 and a screw cap 164. The screw 162 is inserted through the two second fulcrum holes 1168 and the shaft hole 1346. The screw cap 164 is screwed to the screw 162, thereby rotatably fastening a shaft block 134 to a corresponding fulcrum arm 116. Due to such structure, the shaft block 134 can rotate in the block cavity 1166. That is, the rotational plate 130 can rotate about the third rotational axis 106.

The two rod seats 136 are positioned corresponding to the driving rods 124, respectively. Each of the rod seats 136 defines a rod cavity 1362 and two third fulcrum holes 1364.

The two third fulcrum holes 1364 are aligned and thereby define the second rotational axis 104. The driving end 1242 of the driving rod 124 is received in the rod cavity 1362, with the rod hole 1244 aligned with the two respective third fulcrum holes 1364. The auxiliary device 100 further includes two second fastening pins 170. Each of the second fastening pin 170 is configured for rotatably fastening a driving end 1242 of a driving rod 124 to a respective rod seat 136. For example, the second fastening pin 170 is a nail and matches with the rod hole 1244 and the two third fulcrum holes 1364. Therefore, the driving rod 124 is rotatably received in the block cavity 1362. That is, the rotational plate 130 can rotate about the second rotational axis 104.

The suction member 140 can be a vacuum mouth and is fixed to the rotational plate 130 with its suction mouth opposing the surface 1322 of the main board 132. In this embodiment, the auxiliary device 100 further includes two fixing boards 180. The two fixing boards 180 are fixed to the surface 1322 of the main board 132. Each of the two fixing boards 180 supports two suction members 140.

During operation, the auxiliary device 100 is positioned on the mechanical arm so that the workpiece is grasped by the suction members 140. When the reciprocating engine 120 is activated, the driving rod 124 moves the rotational plate 130 about the third rotational axis 106, thereby adjusting the position of the workpiece.

The number of the reciprocating engines 120, the cylindrical seats 114, the fulcrum arms 116, the shaft blocks 134, the rod seats 136, the suction members 140, the first fastening pins 160, the second fastening pins 170, and the fixing boards 180 is not limited to that in the described embodiments, but can be set depending on requirements. For example, all can be one to reduce the cost of the auxiliary device 100.

In the described embodiment, while 'fixed' denotes fastening of components via screwing, the fixing means is not limited thereto.

It will be understood that particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. An auxiliary device for a mechanical arm comprising:
   a supporting base comprising a supporting plate, a cylindrical seat, and a fulcrum arm, the supporting plate being fixed to the mechanical arm, the cylindrical seat and the fulcrum arm being fixed to a surface of the supporting plate opposing the mechanical arm;
   a reciprocating engine comprising a cylinder and a driving rod, the cylinder being configured for driving the driving rod linearly and reciprocating along the longitudinal axis of the driving rod, the cylinder being rotatably received in the cylindrical seat of the supporting base, thereby defining a first rotational axis between the cylinder and the supporting base;
   a rotational plate, to which the driving rod is rotatably fixed, thereby defining a second rotational axis therebetween, the rotational plate being further directly and rotatably fixed to the fulcrum arm of the supporting base to be rotatable about a third rotational axis defined between the rotational plate and the supporting base, wherein the first, second, and third rotational axes are parallel; and
   a suction member fixed to the rotational plate.

2. The auxiliary device as claimed in claim 1, further comprising a connection member connecting the supporting base to the mechanical arm.

3. The auxiliary device as claimed claim 1, wherein the cylindrical seat comprises a button plate and two side plates, the button plate being fixed to the surface of the supporting plate opposing the mechanical arm, the side plates being uprightly fixed to the button plate opposing the supporting plate and defining a cylindrical cavity therebetween and two fulcrum holes, respectively, the cylindrical cavity being configured for receiving a rotating cylinder, the two fulcrum holes being aligned to define the first rotational axis, and the cylinder forming two side shafts fitting into the two fulcrum holes.

4. The auxiliary device as claimed in claim 1, wherein the fulcrum arm comprises a first button plate and a frame, the first button plate being fixed to the surface of the supporting plate opposing the mechanical arm, the frame being vertically fixed to the first button plate opposing the supporting plate, the frame defining a block cavity and two fulcrum holes, the two fulcrum holes being aligned to define the third rotational axis, the rotational plate comprising a main board and a shaft block, the shaft block being fixed to a surface of the main board facing the supporting base and positioned corresponding to the fulcrum arm, the shaft block defining a shaft hole, and being received in the block cavity with the shaft hole aligned with the two fulcrum holes, wherein the auxiliary device further comprises a fastening pin rotatably fastening the fulcrum arm to the shaft block.

5. The auxiliary device as claimed in claim 4, wherein the fastening pin comprises a screw and a screw cap, the screw fitting into the shaft hole and the two fulcrum holes and inserted therethrough.

6. The auxiliary device as claimed in claim 4, wherein the shaft block comprises a second button plate and a rotating block, the second button plate being fixed to the surface of the main board facing the supporting base, and the rotating block fixed to the second button plate.

7. The auxiliary device as claimed in claim 1, wherein the cylinder is a hydraulic pressure cylinder.

8. The auxiliary device as claimed in claim 1, wherein the cylinder is an air pressure cylinder.

9. The auxiliary device as claimed in claim 1, wherein the driving rod comprises a driving end defining a rod hole, the rotational plate includes a main board and a rod seat fixed to a surface of the main board facing the supporting base and positioned corresponding to the driving rod and defining a rod cavity and two fulcrum holes, the driving end being received in the rod cavity with the rod hole aligned with the two fulcrum holes, and wherein the auxiliary device further comprises a fastening pin rotatably fastening the rod end to the rod seat.

10. The auxiliary device as claimed in claim 9, wherein the fastening pin is a nail.

11. The auxiliary device as claimed in claim 1, wherein the suction member is a vacuum mouth.

* * * * *